United States Patent Office 3,165,501
Patented Jan. 12, 1965

3,165,501
NITRO-AROMATIC TELOMERS
Maurits Krukziener, Amsterdam, Netherlands, assignor to Shell Oil Company, a corporation of Delaware
No Drawing. Original application Nov. 2, 1959, Ser. No. 850,078, now Patent No. 3,116,250, dated Dec. 31, 1963. Divided and this application June 12, 1963, Ser. No. 287,181
Claims priority, application Netherlands, Nov. 18, 1958, 233,324
13 Claims. (Cl. 260—80.5)

The invention relates to new and improved oil-soluble non-soluble non-ash forming nitro-aromatic telomeric polymers and their preparation.

In the field of lubrication non-ash forming polymers possessing detergent and other desirable lubricating oil properties are particularly desired.

It has now been found that telomers prepared by polymerizing olefinic unsaturated monomers with oleophilic groups (A) in the presence of aromatic nitro compounds or copolymerizing with olefinic unsaturated monomers (B) so that the terminal of the polymer, homo- or copolymer, contains a nitro-aromatic group, exhibit excellent detergent properties when used in lubricants. The telomers are believed to be represented essentially by the formula:

$$-(A)_n(B)_m-Y$$

where A and B are as defined above, Y is a nitro-aromatic radical, and $n$ and $m$ are integers with $n$ being at least 5 and the sum of $n$ and $m$ being such that the molecular weight of the telomeric polymer is at least 1200, and up to 20,000, preferably between 2000 and 10,000.

The detergent properties which the nitro-aromatic telomers of this invention possess are surprising. For instance, the telomeric nitrobenzene/stearyl methacrylate polymer effects detergency to a greater extent even than basic amino- or amide-containing polymers such as commercially available copolymers of lauryl methacrylate and diethylaminoethyl methacrylate and copolymers of lauryl methacrylate and vinyl pyrrolidone.

The olefinic unsaturated monomers A used for the production of the telomers may be homopolymerized by means of the C=C double bond or copolymerized with one or more suitable B monomers. Their structure may be represented by the following general formula:

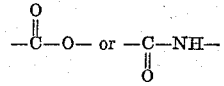

in which $R_1$ and $R_2$ are hydrogen atoms or methyl groups. $R_3$ is an oleophilic group having 8 or more carbon atoms while $R_4$ may be a hydrogen atom, a hydrocarbon radical or a polar substituent. Hence the substituent $R_4$ may also represent an oleophilic group which is similar or dissimilar to $R_3$. The said oleophilic group $R_3$ contains at least 8 carbon atoms, and preferably 12–20 atoms.

By oleophilic groups are here meant substituents whose presence solutilizes the telomer molecules in hydrocarbon media. The said oleophilic groups contain or entirely consist of cyclic and/or acyclic hydrocarbon radicals having at least 8 carbon atoms. In addition, polar groups and/or heteroatoms may also occur in the oleophilic groups, provided their presence does not result in the telomer becoming insoluble in oil.

Specially suitable oleophilic groups include cyclic hydrocarbon radicals among which may be mentioned, for example, alkaryl groups, particularly alkylphenyl groups such as the p-octylphenyl group. Acyclic hydrocarbon radicals are also important, preferably branched or unbranched aliphatic hydrocarbon chains such as diisobutyl, dodecyl, tetradecyl and hexadecyl groups.

The oleophilic groups may also contain polar groups, e.g.

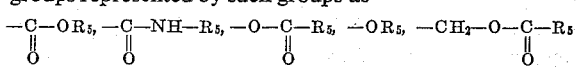

and/or heteroatoms such as —O— in addition to the above-mentioned cyclic and acyclic hydrocarbon radicals. Particularly important in this connection are oleophilic groups represented by such groups as $$-\underset{\underset{O}{\|}}{C}-OR_5, -\underset{\underset{O}{\|}}{C}-NH-R_5, -O-\underset{\underset{O}{\|}}{C}-R_5, -OR_5, -CH_2-O-\underset{\underset{O}{\|}}{C}-R_5$$

and —CH$_2$—O—R$_5$, in which R$_5$ represents a substituted or non-substituted hydrocarbon radical. The R$_5$ group is generally a cyclic or acyclic hydrocarbon radical, which may or may not be substituted by polar groups and/or heteroatoms, although a branched or unbranched alkyl group such as the lauryl, triisobutyl, hexadecyl and stearyl group is preferred.

Suitable A monomers include olefins, particularly such alpha-olefins as decene and cetene; styrene derivatives, such as aralkyl styrenes, e.g. para-octyl styrene and ar-dodecyl alpha-methyl styrene; ethers such as propenyl 2-ethylhexyl ethers and vinyl octadecyl ether; esters of alkenols and carboxylic acids, preferably aliphatic carboxylic acids, e.g. vinyl stearate, allyl palmitate and methallyl oleate; esters of unsaturated acids and alcohols derived from such acids as acrylic acid, methacrylic acid, maleic acid, fumaric acid, the crotonic acids, citraconic acid and cinnamic acid, e.g. lauryl and stearyl (meth) acrylate, dihexadecyl maleate, didodecyl citraconate; and acid amides, such as hexadecyl-methacrylic acid amide.

Very good results are obtained when the monomer (A) is an alkyl ester of acrylic acid or methacrylic acid. Lauryl methacrylate and stearyl methacrylate have been found particularly suitable, although in a very advantageous embodiment of the invention use is made of mixtures of lauryl methacrylate and stearyl methacrylate for example, since the lubricating oil additives produced therewith act as pour point depressants with regard to the unmixed components.

The (B) monomers according to the invention are olefinic unsaturated compounds capable of copolymerizing with the (A) monomers or with the (A) monomers and other (B) monomers, by means of a C=C double bond. A large number of comparatively divergent types of possible monomers are suitable for this purpose. The structure which all these various types of monomers should satisfy may be represented by the following general formula:

in which $R_6$ and $R_7$ are hydrogen atoms or methyl groups. $R_6$ and $R_9$ may be hydrogen atoms or hydrocarbon radicals or polar substituents containing not more than 7 carbon atoms.

The hydrocarbon radicals may be cyclic and/or acyclic, e.g. tolyl, cyclohexyl, benzyl as well as branched or unbranched alkyl and alkenyl groups such as methyl.

By polar substituents are herein meant non-metallic atoms of groups V to VII of the Periodic Table, e.g. nitrogen, phosphorus, oxygen, sulfur and chlorine, in particular nitrogen and oxygen, or groups containing such atoms; the said atoms and groups may or may not form part of or be bound to hydrocarbon radicals. Examples of the said groups are —XR, —CXXR, —NO$_2$, —CN, —SCN, —NR$_2$,

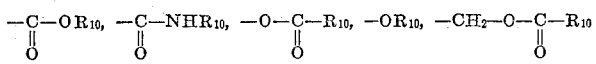

in which X=oxygen or sulfur and R=hydrogen or a hydrocarbon radical.

Examples of very suitable polar substituents are carboxyl, cyano, and amino and amido groups. An important type contains a tertiary amino or amido group in the form of a heterocyclic nitrogen-containing group such as a pyridine group or an N-substituted alpha-pyrrolidone group. Among the polar substituents are here also included such substituents as —C—OR$_{10}$, —C—NHR$_{10}$, —O—C—R$_{10}$, —OR$_{10}$, —CH$_2$—O—C—R$_{10}$
‖ ‖ ‖ ‖
O O O O and —CH$_2$—O—R$_{10}$, in which R$_{10}$ represents a substituted or unsubstituted hydrocarbon radical. Care should be taken to ensure that the entire polar substituent does not contain more than 7 carbon atoms. In the case of a group such as

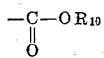

the R$_{10}$ group should, therefore, not contain more than 6 carbon atoms. Suitable substituents of this type are represented by the group

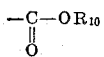

in which the hydrocarbon radical R$_{10}$ is preferably substituted by one or more hydroxyl and/or amino groups, particularly the

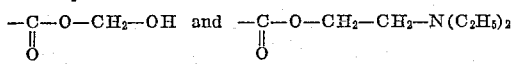

groups.

Suitable (B) monomers according to the invention include olefins, e.g. propylene, 1- or 2-butylene, diisobutylene and others, and aromatic hydrocarbons such as styrene, although use is preferably made of acids, e.g. maleic acid or the anhydride thereof, particularly methacrylic acid; of alcohols such as allyl alcohol; of pyridine derivatives such as 2-methyl-5-vinyl pyridine, and of pyrrolidone derivatives such as N-vinyl-alpha-pyrrolidone. Esters and amides of acrylic acid and methacrylic acid, ethers and esters of phenols such as vinyl alcohol and allyl alcohol, e.g. vinyl acetate, are also suitable. Esters having such groups as

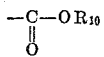

in which the R$_{10}$ substituent contains one or more hydroxyl and/or amino groups, have also been found particularly valuable. Use is preferably made of beta-hydroxy-ethyl methacrylate and beta-di-ethyl amino ethyl methacrylate.

If desired, additional polar groups may be introduced on completion of the telomerization or polar groups already present may be changed, for example, by hydrolysis of O-acyl groups to hydroxyl groups.

The telomer group according to the invention is produced by polymerizing or copolymerizing together with one or more B monomers one or more A monomers in the presence of a telomeric agent such as an aromatic nitro-compound, e.g. nitro-benzene. Especially suitable combinations of the A and B monomers are mixtures of lauryl methacrylate and/or stearyl methacrylate on the one hand and methacrylic acid and/or beta-hydroxy ethyl methacrylate on the other hand.

The telomerizing agent, namely, an aromatic nitro-compound, may be mono- or polycyclic. If desired, they may contain other polar groups such as amino, hydroxy, cyano and carboxyl groups, either in the aromatic nucleus or in a side chain. An example is 4-diethyl amino-1,3-dinitrobenzene, although preference is given to monocyclic aromatic nitro compounds such as nitrated benzene derivatives, which may or may not be alkylated. Examples are dinitrobenzene, nitrotoluenes and others. A very suitable nitro compound is nitrobenzene.

The telomerization agent is generally employed in excess, it being possible to use an inert solvent (for example, a lubricating oil). It has, however, been found advantageous to use the telomerization agent simultaneously as a solvent. On completion of the reaction the excess products by means of distillation, with or without (super-heated) steam, the telomer reaction product may, however, also be isolated in another manner, for example, by precipitating it in a polar solvent such as methanol.

The telomerization may be carried out not only in solution but in special cases also in emulsion or suspension. The telomerization is carried out in the presence of an initiator, viz. a radical source such as benzoyl peroxide, tertiary butyl hydroperoxide, cumene hydroperoxide, azodiisobutyric nitrile and other substances conventionally employed for this purpose. The radicals may however, also be produced thermally or by irradiation (ultraviolet, gamma rays and the like). The amount of initiator is at least 5 mol percent, particularly 10–40 mol percent, preferably 25–30 mol percent of the monomer mixture. The reaction may be carried out in an atmosphere of an inert gas such as nitrogen, but this is not essential. Temperatures of 0° C. to 250° C., for example, may be used, although the optimum temperature depends on the rate of decomposition of the initiator employed.

It has been found that lubricants in which the products of the invention are incorporated have excellent detergent properties. This applies in particular to the inhibition of the fouling of pistons, piston rings and cylinders which occurs in engine cylinders, for example, in combustion engines such as Diesel engines and gasoline engines such as automobile engines and aero piston engines. If desired, mixtures of separately prepared telomer products may also be used, e.g. mixtures of telomers in which divergent A monomers are employed.

The said products are suitable as additives to lubricants of various types. In the first place may be mentioned mineral lubricating oils of diverse viscosity, although the products are also suitably incorporated into synthetic lubricating oils as well as into lubricating oils containing fatty acids. The products may also be worked up in lubricating greases.

The products may be added as such to the lubricant. In an advantageous embodiment the product is only partly freed from the solvent and/or telomerization agent, e.g. by steam distillation; a small quantity of a lubricating oil is then added and the remnants of the solvents and/or telomerization agents are finally distilled off by steam preferably under reduced pressure. The resultant concentrate may now be diluted with a lubricating oil and/or worked up into a lubricating grease.

The quantity of the products of the invention incorporated into lubricants may vary within wide limits. In general, the desired detergent effect is obtained when the quantity incorporated lies between 0.5 and 5%, particularly between 1 and 3%, based on the weight of the finished lubricant. In special cases, however, larger or smaller quantities may also be incorporated, but in any case more than 0.5% by weight.

Specific examples of telomers of this invention and their preparation are as follows:

EXAMPLE I

*Telomerization of Stearyl Methacrylate With Nitro-Benzene*

24 parts by weight of benzoyl peroxide were added to a mixture of 300 parts by weight of stearyl methacrylate and 300 parts by weight of nitro-benzene at a bath temperature of 90° C. with stirring, followed by 5 portions of 6 grams each every half hour. Thus, a total of 54 parts by weight of benzoyl peroxide had been added with stirring over a period of three hours. The mass was then poured with stirring into 1200 parts by weight of methanol of −10° C. Two layers resulted of which the lower one formed a brown slurry. The bottom layer was then separated and the nitro-benzene finally distilled off with superheated steam (130° C.). 211 parts by weight of product were obtained as residue. This was a light brown, solid mass. The nitrogen content was 0.34–0.38%, the molecular weight approximately 3500.

EXAMPLE II

*Telomerization of Stearyl Methacrylate and Beta-Hydroxy Ethyl Methacrylate With Nitro-Benzene*

A mixture of 338 parts by weight (1 mol) of stearyl methacrylate, 26 parts by weight (0.2 mole) of beta-hydroxy ethyl methacrylate and 400 parts by weight of nitro-benzene were heated at 90° C. 40 parts by weight of benzoyl peroxide were then added with stirring, followed by 3 portions of 20 parts by weight each every half hour. Thus, the total of 100 parts by weight of benzoyl peroxide had been added after two hours.

The reaction mixture was then decanted in cooled methanol (−10° C.) and the resultant precipitate filtered off and dissolved in benzene. The benzene solution was also poured into methanol, after which this procedure was twice repeated with the resultant precipitate. The yield calculated on the intake of monomers amounted to 87% by weight. The product was a brown powder.

ENGINE TESTS

The engine tests were carried out in a Caterpillar diesel engine and a Petter gasoline engine. The following table shows the favorable results obtained with respect to the piston fouling and the formation of cold sludge. The doped lubricating oils were 2% by weight solutions of the additives prepared according to the examples in a Venezuelan mineral lubricating oil having a viscosity of 114 cs. at 100° F.

| Composition | Caterpillar Piston Fouling | | Petter Sludge Rating, 10=Clean |
|---|---|---|---|
| | Rating, 10=Clean | Deposits, mg. | |
| 1. Mineral lubricating oil | 0.3 | 880 | 3.4 |
| 2. (1)+2% Acryloid 966 | 3.9 | 331 | 5.2 |
| 3. (1)+2% LOA 564 | 5.7 | 593 | 5.7 |
| 4. (1)+2% NS/SMA copolymer (1:5) (MW 2560) | 3.1 | 401 | |
| 5. (1)+2% NS/LMA/SMA copolymer (1:5:5) | 1.7 | 339 | |
| 6. (1)+2% of Telomer of Ex. I | 4.8 | 288 | 6.0 |
| 7. (1)+2% Telomer of Ex. II | 7.0 | 175 | 6.5 |

Acryloid 966=Copolymer of lauryl methacrylate/N-vinyl pyrrolidone.
LOA 564=Copolymer of lauryl methacrylate/diethylaminoethyl-methacrylate.
SMA=Stearyl methacrylate.
LMA=Lauryl methacrylate.
NS=p-Nitrostyrene.
Caterpillar: Water-cooled single cylinder four-stroke engine. The test lasted 48 hours. The fuel was a gas oil having a sulfur content of 0.8% by weight. The cooling water temperature was approximately 80° C. The engine power was 18 H.P.; bore 5¼″; stroke 8″; swept volume 3.4 liters.
Petter: Water-cooled single cylinder four-stroke engine. The test lasted 28 hours. The fuel was a motor gasoline having 1.5 ml. TEL per U.S. gallon and a sulfur content of 0.07% by weight. The cylinder cooling water temperature was approximately 55° C.

In their use the present products may also be combined with other additives such as anti-oxidants, pour point depressants viscosity index improvers, corrosion inhibitors, wear-inhibitors, peptizing agents, anti-foaming agents, extreme-pressure and oiliness agents and other materials generally added to lubricants.

This patent application is a division of co-pending case Serial No. 850,078, filed November 2, 1959, which has matured into U.S. Patent No. 3,116,250, on December 31, 1963.

I claim as my invention:

1. As a new compound an oil-soluble telomer obtained by copolymerizing in substantially equal parts by weight and at a temperature ranging from 0° C. to 250° C., a mono-olefinic unsaturated taxogenic monomer containing at least one oleophilic group of at least 8 carbon atoms with a telogenic nitrobenzene in substantially equal parts by weight and at a temperature ranging from 0° C. to 250° C., said telomer having a molecular weight range of from 1,200 to 20,000.

2. As a new compound an oil-soluble telomer obtained by copolymerizing in the presence of at least 5 mol percent of an initiator selected from the group consisting of benzoyl peroxide, tertiary butyl hydroperoxide, cumene hydroperoxide, and azodiisobutyric nitrile, (A) a mono-olefinic unsaturated taxogenic monomer containing an oleophilic group of at least 8 carbon atoms and (B) an olefinic unsaturated monomer containing a polar group, with a telogenic nitrobenzene in substantially equal parts by weight and at a temperature ranging from 0° C. to 250° C., said telomer having a molecular weight range of from 1,200 to 20,000.

3. The compound of claim 2 in which the telomers of claim 2 are as follows: (A) has the formula

wherein $R_1$ and $R_2$ are selected from the group consisting of hydrogen and methyl group, $R_3$ is an oleophilic group having at least 8 carbon atoms and $R_4$ is selected from the group consisting of hydrogen, a hydrocarbyl and a polar radical having not more than 7 carbon atoms and (B) has the formula

where $R_6$ and $R_7$ are the same as $R_1$ and $R_2$ and $R_8$ and $R_9$ are the same as $R_4$.

4. As a new compound an oil-soluble telomer obtained by polymerizing in the presence of 10–40 mol percent of benzoyl peroxide an acrylate ester of an acrylic acid and an alkanol having at least 8 carbon atoms with telogenic nitrobenzene in substantially equal parts by weight and at a temperature ranging from 0° C. to 250° C., said telomer having a molecular weight of from 1,200 to 20,000.

5. As a new compound an oil-soluble telomer obtained by copolymerizing in the presence of 10–40 mol percent of benzoyl peroxide an acrylate ester of an acrylic acid and an alkanol having at least 8 carbon atoms and a hydroxy $C_{1-4}$ alkyl acrylate with telogenic nitrobenzene in substantially equal parts by weight and at a temperature ranging from 0° C. to 250° C., said telomer having a molecular weight range of from 1,200 to 20,000.

6. As a new compound an oil-soluble telomer obtained by copolymerizing in the presence of 10–40 mol percent of benzoyl peroxide an acrylate ester of an acrylic acid and an alkanol having at least 8 carbon atoms and vinyl pyridine with telogenic nitrobenzene in substantially equal parts by weight and at a temperature ranging from 0° C. to 250° C., said telomer having a molecular weight range of from 1,200 to 20,000.

7. As a new compound an oil-soluble telomer obtained by copolymerizing in the presence of 10–40 mol percent of benzoyl peroxide an acrylate ester of an acrylic acid and an alkanol having at least 8 carbon atoms and vinyl pyrrolidone with an aromatic nitro-compound in substantially equal parts by weight and at a temperature ranging from 0° C. to 250° C., said telomer having a molecular weight range of from 1,200 to 20,000.

8. As a new compound an oil-soluble telomer obtained by polymerizing in the presence of 10–40 mol percent of benzoyl peroxide a $C_{8-18}$ alkyl methacrylate with nitrobenzene in substantially equal parts by weight and at a temperature ranging from 0° C. to 250° C., said telomer having a molecular weight range of from 2,000 to 10,000.

9. As a new compound an oil-soluble telomer obtained by polymerizing in the presense of 10–40 mol percent of benzoyl peroxide, stearyl methacrylate with nitrobenzene in substantially equal parts by weight and at a temperature ranging from 0° C. to 250° C., said telomer having a molecular weight range of from 2,000 to 10,000.

10. As a new compound an oil-soluble telomer obtained by copolymerizing in the presence of 10–40 mol percent of benzoyl peroxide, stearyl methacrylate and beta-hydroxy-ethyl methacrylate with nitrobenzene in substantially equal parts by weight and at a temperature ranging from 0° C. to 250° C., said telomer having a molecular weight range of from 2,000 to 10,000.

11. As a new compound an oil-soluble telomer obtained by copolymerizing in the presence of 10–40 mol percent of benzoyl peroxide, lauryl methacrylate, stearyl methacrylate and beta-hydroxy-ethyl methacrylate with nitrobenzene in substantially equal parts by weight and at a temperature ranging from 0° C. to 250° C., said telomer having a molecular weight range of from 2,000 to 10,000.

12. As a new compound an oil-soluble telomer obtained by copolymerizing in the presence of 10–40 mol percent of benzoyl peroxide, stearyl methacrylate and 2-methyl-5-vinyl-pyridine with nitrobenzene in substantially equal parts by weight and at a temperature ranging from 0° C. to 250° C., said telomer having a molecular weight range of from 2,000 to 10,000.

13. As a new compound an oil-soluble telomer obtained by copolymerizing in the presence of 10–40 mol percent of benzoyl peroxide a stearyl methacrylate and N-vinyl pyrrolidone with nitrobenzene in substantially equal parts by weight and at a temperature ranging from 0° C. to 250° C., said telomer having a molecular weight range of from 2,000 to 10,000.

References Cited by the Examiner
UNITED STATES PATENTS 2,752,387   6/56   Rehberg _____ 260—486
3,116,250   12/63   Krukziener _____ 260—86.1

LEON J. BERCOVITZ, *Primary Examiner.*
DONALD E. CZAJA, *Examiner.*